(12) United States Patent
Wu

(10) Patent No.: US 8,574,796 B2
(45) Date of Patent: Nov. 5, 2013

(54) ABS POLYMER CONTAINING PHOTOCONDUCTORS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 61 days.

(21) Appl. No.: 13/214,464

(22) Filed: Aug. 22, 2011

(65) Prior Publication Data

US 2013/0052577 A1     Feb. 28, 2013

(51) Int. Cl.
 *G03G 5/047*     (2006.01)
(52) U.S. Cl.
 USPC ............ 430/59.6; 430/58.05; 430/58.75
(58) Field of Classification Search
 USPC ............... 430/58.05, 58.75, 59.6
 See application file for complete search history.

(56) References Cited

U.S. PATENT DOCUMENTS

| | | | |
|---|---|---|---|
| 4,464,450 A | 8/1984 | Teuscher | |
| 4,587,189 A | 5/1986 | Hor et al. | |
| 4,892,811 A | 1/1990 | Yagihara et al. | |
| 4,921,773 A | 5/1990 | Melnyk et al. | |
| 5,030,707 A | 7/1991 | Wang | |
| 5,482,811 A | 1/1996 | Keoshkerian et al. | |
| 5,521,306 A | 5/1996 | Burt et al. | |
| 7,005,222 B2 | 2/2006 | Horgan et al. | |
| 7,033,714 B2 | 4/2006 | Horgan et al. | |
| 2009/0325094 A1* | 12/2009 | Tong et al. | 430/58.8 |
| 2010/0178074 A1* | 7/2010 | Nakatake et al. | 399/111 |
| 2010/0210789 A1* | 8/2010 | Seidel et al. | 525/53 |
| 2010/0290807 A1* | 11/2010 | Shimoyama et al. | 399/159 |
| 2011/0123219 A1* | 5/2011 | Gilmartin et al. | 399/109 |
| 2012/0252977 A1* | 10/2012 | Zhu et al. | 525/64 |

* cited by examiner

*Primary Examiner* — Mark F Huff
*Assistant Examiner* — Rachel Zhang
(74) *Attorney, Agent, or Firm* — Eugene O. Palazzo

(57) ABSTRACT

A photoconductor that includes an optional anticurl layer, optional supporting substrate, an optional ground plane layer, an optional hole blocking layer, an optional ground strip segment, an optional adhesive layer, a photogenerating layer, and a charge transport layer that contains an acrylonitrile-butadiene-styrene polymer.

18 Claims, 1 Drawing Sheet

ABS POLYMER CONTAINING PHOTOCONDUCTORS

There are disclosed terpolymer containing photoconductors, and photoconductors comprising an optional supporting substrate, a photogenerating layer, and a charge transport layer that includes a charge transporting component, an acrylonitrile-butadiene-styrene (ABS) polymer, and an optional charge transporting polymeric binder.

BACKGROUND

Layered photoconductors that can be selected for various copying and printing processes are known. Each of the layers of the photoconductors serves a certain function, such as generating charges, and transporting charges. This raises a number of considerations because the components of these layers can, for example, influence the photoconductor properties.

Multilayered photoconductors can comprise a supporting substrate, an electrically conductive layer, an optional charge blocking layer, an optional adhesive layer, a charge generating layer, a charge transport layer, and an optional protective or overcoating layer. These multilayered photoreceptors can be provided in any of various forms, such as flexible belts, rigid drums, and flexible scrolls. Flexible photoconductor belts may either be seamed or seamless. An anticurl layer may also be coated on the back side of the flexible substrate support, or the side or surface opposite to the electrically active layers, to achieve the desired photoreceptor belt flatness.

A number of photoconductors exhibit mechanical failures, such as frictional abrasion, undesirable wear characteristics, and significant surface cracking. Photoconductor surface cracking is primarily induced because of the dynamic fatigue of the belt flexing over the supporting rollers of a machine belt support module or cracking can be caused by exposure to airborne chemical contaminants as the photoconductor segments directly bend over the rollers after periods of photoconductor belt non-use during machine idling. These chemical contaminants include solvent vapors and corona species emitted by machine charging subsystems. Surface cracking can also be exacerbated by the combination of the effects provided by fatigue belt flexing and airborne chemical exposure. In turn, photoconductor cracking can manifest itself as printout defects that seriously impact copy quality. Further, surface cracking may require the untimely replacement of photoconductors at significant costs. While used photoconductor components can be partially recycled, there continues to be added costs and potential environmental hazards when recycling.

Also known are photoconductors that have a minimum or lack of resistance to abrasion from dust, charging rolls, toner, and carrier. Additionally, the surface layers of photoconductors are subject to scratches, which decrease their lifetime, and in xerographic imaging systems adversely affect the quality of the developed images.

Thus, there is a need for photoconductors with excellent or acceptable mechanical characteristics, especially in xerographic systems where biased charging rolls (BCR) are used.

Further, there is a need for photoconductors that exhibit minimum wear or possess wear resistance characteristics, especially in xerographic processes and machines.

Additionally, there is a need for polymeric binders that can effectively have dispersed therein a charge transport compound and a second binder, and which polymeric binders are compatible with conventional polymer binders used in charge transport layers, such as polycarbonates.

Photoconductors with excellent cyclic characteristics and stable electrical properties, stable long term cycling, minimal charge deficient spots (CDS), and acceptable lateral charge migration (LCM) characteristics, such as excellent LCM resistance, are also desirable.

These and other needs are believed to be achievable in embodiments with the photoconductors disclosed herein.

SUMMARY

Disclosed is a photoconductor comprising an acrylonitrile-butadiene-styrene polymer charge transport layer.

Also disclosed is a photoconductor comprising a supporting substrate, a photogenerating layer, and a charge transport layer comprising a mixture of a charge transport compound, an optional polycarbonate, and an acrylonitrile-butadiene-styrene terpolymer.

Further there is disclosed a wear resistant photoconductor comprising an optional supporting substrate layer, an optional hole blocking layer, an optional ground strip segment, an optional adhesive layer, a photogenerating layer, and a charge transport layer containing a mixture of a charge transport compound and an acrylonitrile-butadiene-styrene polymer where the photoconductor wear rate is from about 15 to about 25 nanometers per kilocycle.

FIGURES

There are provided the following Figures to further illustrate the photoconductors disclosed herein.

EMBODIMENTS

In embodiments of the present disclosure, there is illustrated a photoconductor comprising in sequence an optional anticurl layer, an optional supporting substrate, an optional hole blocking layer, an optional ground strip layer, an optional adhesive layer, a photogenerating layer, and at least one charge transport layer comprising a charge transport component, and an acrylonitrile-butadiene-styrene polymer such as an acrylonitrile-butadiene-styrene terpolymer.

Figure 1:
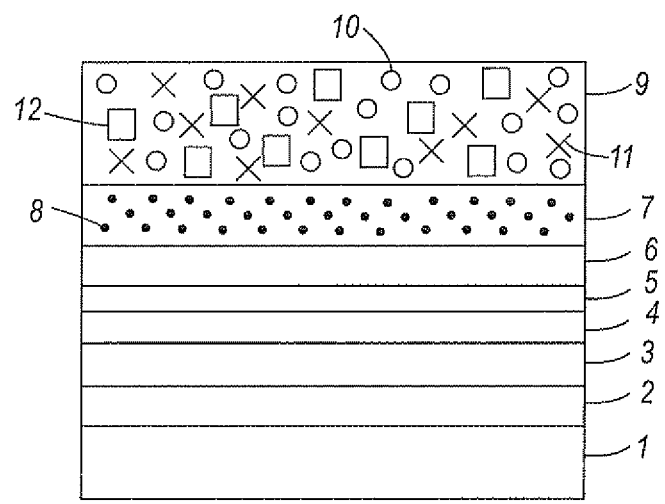
FIG. 1 illustrates an exemplary embodiment of a layered photoconductor of the present disclosure.
Figure 2:
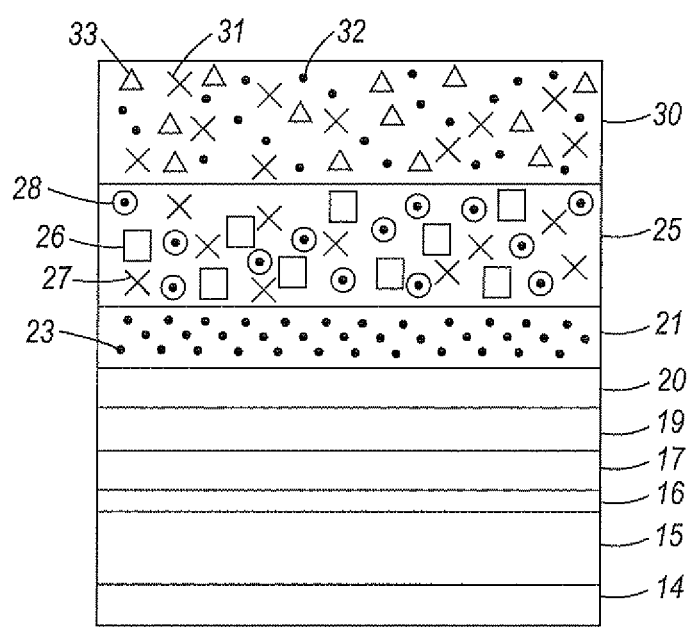
FIG. 2 illustrates another exemplary embodiment of a layered photoconductor of the present disclosure.

Exemplary and non-limiting examples of photoconductors according to embodiments of the present disclosure are depicted in FIGS. 1 and 2.

In FIG. 1, there is illustrated a photoconductor comprising optional supporting substrate layer 1, an optional ground plane layer 2, an optional hole blocking layer 3, an optional ground strip layer 4, an optional adhesive layer 5, a photogenerating layer 7 containing photogenerating pigments 8 dispersed therein, and a charge transport layer 9 containing a mixture of charge transport compounds 10, resin binders, such as polycarbonates 11, and acrylonitrile-butadiene-styrene terpolymers 12.

In FIG. 2, there is illustrated a photoconductor comprising an optional anticurl layer 14, an optional supporting substrate layer 15, an optional ground plane layer 16, an optional hole blocking layer 17, an optional adhesive layer 19, an optional ground strip layer 20, a photogenerating layer 21 containing photogenerating pigments 23 dispersed therein, a first charge transport layer 25 containing charge transport compounds 26, polycarbonates 27, and acrylonitrile-butadiene-styrene terpolymers 28, and an optional second charge transport layer 30 containing a mixture of charge transport compounds 31, polymeric binders 32, and acrylonitrile-butadiene-styrene terpolymers 33.

Substrate

The optional supporting substrate may comprise a number of materials, such as an electrically nonconductive material or a conductive material. Examples of supporting substrates for the disclosed photoconductors include polyesters, polycarbonates, polyamides, polyurethanes, and the like, and mixtures thereof.

The electrically conducting supporting substrate may be comprised of any suitable metal including aluminum, nickel, steel, copper, gold, and the like, and mixtures thereof, or a polymeric material filled with an electrically conducting substance. Examples of electrically conducting substances include carbon, metallic powder, and the like, or an organic electrically conducting material.

When the supporting substrate layer is not conductive, the surface may be rendered electrically conductive by depositing thereon a known electrically conductive coating. The conductive coating may vary in thickness over substantially wide ranges, such as from about 1 to about 50 microns, from 1 to about 35 microns, or from about 3 to about 25 microns, depending upon the optical transparency desired, the desired degree of the supporting substrate flexibility, and economic factors.

Illustrative examples of substrates include a layer of insulating material including inorganic or organic polymeric materials, such as MYLAR® (a commercially available polymer), MYLAR® containing titanium, a layer of an organic or inorganic material having a semiconductive surface layer, such as indium tin oxide or aluminum arranged thereon, or a conductive material inclusive of aluminum, chromium, nickel, brass, or the like, and mixtures thereof.

The thickness of the photoconductor supporting substrate depends on many factors, including economical considerations, electrical characteristics, adequate flexibility, availability, and cost of the specific components for each layer, and the like. Thus, this layer may be of a substantial thickness of, for example, up to about 3,500 microns, such as from about 1,000 to about 3,000 microns, from about 1,500 to about 2,500 microns, from about 500 to about 1,000 microns, from about 300 to about 700 microns, or of a minimum thickness of, for example, from about 75 to about 250 microns, or from about 100 to about 150 microns.

The supporting substrate for the disclosed photoconductors may be flexible, seamless, or rigid, and may have a number of many different configurations, such as for example, a sheet or plate, a cylindrical drum, a scroll, an endless flexible belt, a web, a drelt (a cross between a drum and a belt), and the like. In embodiments, the substrate is in the form of a seamless flexible belt.

Anticurl Layer

In some situations, it may be desirable to coat an optional anticurl layer on the back of the photoconductor supporting substrate, particularly when the substrate is a flexible organic polymeric material. This anticurl layer is sometimes referred to as an anticurl backing layer. Suitable materials for the photoconductor anticurl layer include, for example, polycarbonate materials commercially available as MAKROLON®, and the like. The anticurl layer can be of a thickness of, for example, from about 0.1 to about 5 microns, from about 0.5 to about 3 microns, or from about 1 to about 2 microns.

Ground Plane Layer

Positioned on the top side of the supporting substrate there can be included an optional ground plane such as gold, gold containing compounds, aluminum, titanium, titanium/zirconium, and other suitable known components. The thickness of the ground plane layer can be from about 10 to about 100 nanometers, from about 20 to about 50 nanometers, or about 35 nanometers. In one non-limiting example, the disclosed titanium or titanium/zirconium ground plane can have a thickness of from about 10 to about 30 nanometers, or about 20 nanometers Hole-Blocking Layer A charge blocking layer or hole blocking layer may optionally be applied to a photoconductor layer, such as the supporting substrate surface, prior to the application of a photogenerating layer. The optional charge blocking layer or hole blocking layer, when present, is usually in contact with the ground plane layer.

Any suitable hole blocking layer capable of forming an effective barrier to hole injection from the adjacent layer into the photoconductive or photogenerating layer may be utilized. Examples of hole blocking layer materials may include aminosilanes, metal oxides such as zinc oxide or titanium oxide, silica, polyvinyl butyral, phenolic resins, nitrogen containing siloxanes or nitrogen containing titanium compounds such as disclosed, for example, in U.S. Pat. No. 4,291,110; U.S. Pat. No. 4,338,387; U.S. Pat. No. 4,286,033 and U.S. Pat. No. 4,291,110, the disclosures of each of these patents being totally incorporated herein in their entirety, and the like.

Examples of aminosilanes that can be included in the disclosed hole blocking layer can be represented by

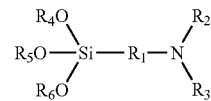

wherein $R_1$ is a straight chain or branched alkylene group containing from 1 to about 25 carbon atoms, from 1 to about 18 carbon atoms, from 1 to about 12 carbon atoms, or from 1 to about 6 carbon atoms; $R_2$ and $R_3$ are independently selected from the group consisting of at least one of hydrogen, alkyl containing from 1 to about 12 carbon atoms, or from 1 to about 4 carbon atoms, aryl with from about from about 6 to about 24 carbon atoms, from about 6 to about 18 carbon atoms, or from about 6 to about 12 carbon atoms, such as a phenyl group, and a poly(alkylene amino) group, such as a poly(ethylene amino) group; and where $R_4$, $R_5$ and $R_6$ are independently an alkyl group containing from 1 to about 10 carbon atoms, or from 1 to about 4 carbon atoms.

Specific examples of suitable aminosilanes are 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy) silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino)ethylamino]-3-proprionate, (N,N'-dimethyl 3-amino)propyl triethoxysilane, N,N-dimethylaminophenyl triethoxysilane, trimethoxysilyl propyldiethylene triamine, and the like, and mixtures thereof. Yet more specific aminosilane materials are 3-aminopropyl triethoxysilane (γ-APS), N-aminoethyl-3-aminopropyl trimethoxysilane, (N,N'-dimethyl-3-amino)propyl triethoxysilane, and mixtures thereof.

The aminosilane may be hydrolyzed to form a hydrolyzed silane solution before being added into the final hole blocking layer coating solution or dispersion. During hydrolysis of the aminosilanes, the hydrolyzable groups, such as the alkoxy groups, are replaced with hydroxyl groups. The pH of the hydrolyzed silane solution can be controlled to obtain excellent characteristics on curing, and to result in electrical stability. A solution pH of, for example, from about 4 to about 10 can be selected, such as a pH of from about 7 to about 8. Control of the pH of the hydrolyzed silane solution may be affected with any suitable material, such as generally organic acids or inorganic acids. Typical organic and inorganic acids include acetic acid, citric acid, formic acid, hydrogen iodide, phosphoric acid, hydrofluorosilicic acid, p-toluene sulfonic acid, and the like.

The hole blocking layer can, in embodiments, be prepared by a number of known methods, the process parameters being dependent, for example, on the photoconductor member desired. The hole blocking layer can be coated as a solution or a dispersion onto the supporting substrate, or onto the ground plane layer by the use of a spray coater, dip coater, extrusion coater, roller coater, wire-bar coater, slot coater, doctor blade coater, gravure coater, and the like, and dried by heating at from about 40° C. to about 200° C., or from 75° C. to 150° C. for a suitable period of time, such as from about 1 minute to about 10 hours, from about 40 to about 100 minutes, or from about 1 to about 4 hours in the presence of an air flow. The hole blocking coating can be accomplished in a manner to provide a final hole blocking layer coating thickness of, for example, from about 0.01 to about 30 microns, from about 0.02 to about 5 microns, from about 0.2 to about 2 microns, or from about 0.03 to about 0.5 microns after drying.

Adhesive Layer

An optional adhesive layer may be included between the hole blocking layer and the photogenerating layer. Typical adhesive layer components include polyesters, polyurethanes, copolyesters, polyamides, poly(vinyl butyrals), poly(vinyl alcohols), polyacrylonitriles, and the like, and mixtures thereof. The adhesive layer thickness can be from about 0.001 to about 1 micron, from about 0.05 to about 0.5 micron, or from about 0.1 to about 0.3 micron. Optionally, this layer may contain suitable effective amounts of from about 1 to about 10 weight percent, or from 1 to about 5 weight percent of particles, such as zinc oxide, titanium dioxide, silicon nitride, carbon black, and the like, and mixtures thereof.

Ground Strip Layer

Other layers, such as a conventional ground strip layer, including, for example, conductive particles dispersed in a film forming binder may be applied to one edge of the imaging member to promote electrical continuity with the conductive layer through the hole blocking layer, and adhesive layer. The ground strip is illustrated in FIGS. 1 and 2 as being in the form of layers 4 and 20. However, it is understood that usually the ground strip is applied only to a segment, such as one edge, of the imaging member or photoconductor.

The ground strip layer may include any suitable film forming polymer binder and dispersed electrically conductive particles. Typical ground strip materials include those enumerated upon in U.S. Pat. No. 4,664,995, the entire disclosure of which is totally incorporated herein by reference. The ground strip layer may have a thickness of from about 7 to about 40 microns, such as from about 15 to about 25 microns.

Photogenerating Layer

Usually, the photogenerating layer is applied onto the supporting substrate or other underlying layer, and a charge transport layer or a plurality of charge transport layers is formed on the photogenerating layer. The charge transport layer may be situated on the photogenerating layer, the photogenerating layer may be situated on the charge transport layer, or when more than one charge transport layer is present, they can be contained on the photogenerating layer.

Generally, the photogenerating layer can contain known photogenerating pigments, such as metal phthalocyanines, metal free phthalocyanines, alkylhydroxyl gallium phthalocyanines, hydroxygallium phthalocyanines, halogallium phthalocyanines, such as chlorogallium phthalocyanines, perylenes such as bis(benzimidazo)perylene, titanyl phthalocyanines, and the like, and mixtures thereof. More specific examples of photogenerating pigments include vanadyl phthalocyanines, Type V hydroxygallium phthalocyanines, high sensitivity titanyl phthalocyanines, and inorganic components, such as selenium, selenium alloys, and trigonal selenium; pigments of crystalline selenium and its alloys; and Groups II to VI compounds. Organic pigment examples are quinacridones, polycyclic pigments such as dibromo anthanthrone pigments, perinone diamines, polynuclear aromatic quinones, azo pigments including bis-, tris- and tetrakis-azos, and the like.

The photogenerating pigment can be dispersed in a resin binder similar to the resin binders selected for the charge transport layer, or alternatively no resin binder need be present. For example, the photogenerating pigment can be present in an optional resinous binder composition in various amounts inclusive of up to 100 percent by weight. Generally, from about 5 to about 95 percent by volume of the photogenerating pigment is dispersed in about 95 to about 5 percent by volume of a resinous binder, or from about 20 to about 30 percent by volume of the photogenerating pigment is dispersed in about 70 to about 80 percent by volume of the resinous binder composition. In one embodiment, about 90 percent by volume of the photogenerating pigment is dispersed in about 10 percent by volume of a resinous binder composition, and which resin may be selected from a number of known polymers as illustrated herein, such as poly(vinyl butyral), poly(vinyl carbazole), polyesters, polycarbonates, poly(vinyl chloride), polyacrylates and methacrylates, copolymers of vinyl chloride and vinyl acetate, phenolic resins, polyurethanes, poly(vinyl alcohol), polyacrylonitrile, polystyrene, and the like.

It is often desirable to select a coating solvent for the photogenerating layer mixture, and which solvent does not substantially disturb or adversely affect the previously coated layers of the photoconductor. Examples of coating solvents used for the photogenerating layer coating mixture include ketones, alcohols, aromatic hydrocarbons, halogenated aliphatic hydrocarbons, ethers, amines, amides, esters, and the like, and mixtures thereof. Specific solvent examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

Examples of optional polymeric binder materials that can be selected as the matrix for the photogenerating layer include thermoplastic and thermosetting resins, such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, poly(phenylene sulfides), poly(vinyl acetate), polysiloxanes, polyacrylates, polyvinyl acetals, polyamides, polyimides, amino resins, phenylene oxide resins, terephthalic acid resins, phenoxy resins, epoxy resins, phenolic resins, polystyrene, acrylonitrile copolymers, poly(vinyl chloride), vinyl chloride and vinyl acetate copolymers, acrylate copolymers, alkyd resins, cellulosic film formers, poly(amideimide), styrene butadiene copolymers, vinylidene chloride-vinyl chloride copolymers, vinyl acetate-vinylidene chloride copolymers, styrene-alkyd resins, poly(vinyl carbazole), and the like. These polymers may be block, random, or alternating copolymers.

The photogenerating layer can be of a thickness of from about 0.01 to about 10 microns, from about 0.05 to about 10 microns, from about 0.2 to about 2 microns, or from about 0.25 to about 2 microns.

Charge Transport Layer

According to the present disclosure, a charge transport layer is provided that includes an acrylonitrile-butadiene-styrene (ABS) polymer. Typically, the charge transport layer will include the acrylonitrile-butadiene-styrene polymer dispersed with a charge transport component in a binder resin.

The charge transport layer, in embodiments, can be a single charge transport layer or can be in the form of more than one charge transport layer, such as 2, 3, 4, or more charge transport layers. When more than one charge transport layer is present, the acrylonitrile-butadiene-styrene polymer can be included in all or less than all of the separate charge transport layers. In embodiments, the acrylonitrile-butadiene-styrene polymer can be in the form of a terpolymer including only or substantially only acrylonitrile, butadiene, and styrene monomer units, or it can be in the form of a polymer that includes acrylonitrile, butadiene, and styrene monomer units, as well as other monomer units.

Desirably, the acrylonitrile-butadiene-styrene polymer is present in at least the outermost charge transport layer to provide improved wear resistance and other properties to the outermost charge transport layer.

Various suitable acrylonitrile-butadiene-styrene polymers can be selected for the charge transport layer or charge transport layers. Examples of acrylonitrile-butadiene-styrene terpolymers that can be incorporated into the charge transport layer are terpolymers available from Chemtura Corporation of Middlebury, Conn. and include Blendex® 200, 131, 336, 338, 360, 415, 598, or 703.

The terpolymers can be prepared by the reaction of acrylonitrile, butadiene, and styrene monomers, with or without the addition of additional monomer species. More specifically, the terpolymers can be prepared by the free radical polymerization of the three monomers of acrylonitrile, 1,3-butadiene, and styrene in a desired ratio to provide the desired final polymer product.

In the disclosed terpolymers, the acrylonitrile monomer is present, for example, in an amount of from about 15 to about 40 weight percent, from about 15 to about 35 weight percent, from about 15 to about 30 weight percent, from about 20 to about 30 weight percent, or from about 22 to about 28 weight percent of the terpolymer solids. The butadiene monomer of the disclosed terpolymers can be present in an amount of, for example, from about 5 to about 35 weight percent, from about 5 to about 30 weight percent, from about 10 to about 25 weight percent, or from about 12 to about 22 weight percent of the terpolymer solids. Likewise, the styrene monomer can be present in an amount of, for example, from about 40 to about 65 weight percent, from about 40 to about 60 weight percent, from about 45 to about 65 weight percent, from about 45 to about 55 weight percent, or from about 47 to about 53 weight percent of the terpolymer solids, where the terpolymer solids are equal to about 100 percent. Where other monomer units are incorporated into the acrylonitrile-butadiene-styrene polymer, these ratios can be suitably adjusted to accommodate the additional monomer units.

The acrylonitrile-butadiene-styrene polymer can be present in the charge transport layer, or in at least one charge transport layer in a number of differing effective amounts. For example, the acrylonitrile-butadiene-styrene polymer can be present in an amount of from about 0.1 to about 10 weight percent, from about 0.5 to about 10 weight percent, from about 0.5 to about 5 weight percent, from about 0.5 to about 3 weight percent, or from about 1 to about 3 weight percent based on the total solids of the charge transport layer. The weight ratio of the acrylonitrile-butadiene-styrene polymer/charge transport compound/resin binder can likewise be suitably adjusted to provide desired results, and in embodiments is, for example, about 1/40/59, about 0.5/39.5/60, about 1/60/39, about 3/37/60, about 5/45/50, about 2/40/58, or about 1/45/54.

The weight average molecular weight ($M_w$) of the acrylonitrile-butadiene-styrene polymers can be, for example, from about 10,000 to about 500,000, from about 25,000 to about 400,000, or from about 100,000 to about 300,000 as determined by Gel Permeation Chromatography (GPC), and the number average molecular weight ($M_n$) of the acrylonitrile-butadiene-styrene polymers can be, for example, from about 5,000 to about 350,000, from about 20,000 to about 200,000, or from about 50,000 to about 150,000 as determined by Gel Permeation Chromatography (GPC).

Examples of charge transport components included in the charge transport layer are selected from the group consisting of those represented by the following formulas/structures

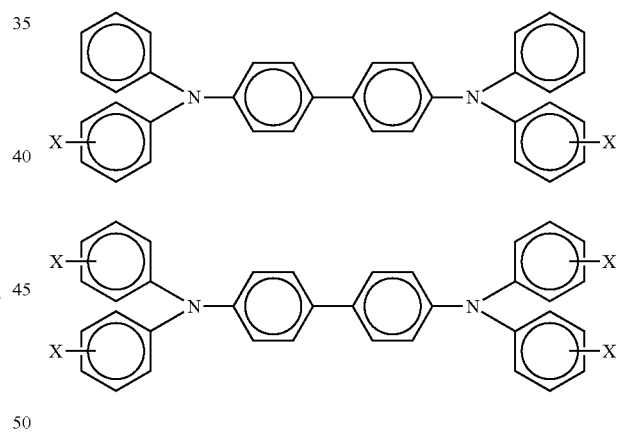

wherein X is alkyl, such as $CH_3$, alkoxy, aryl, and derivatives thereof, a halogen, such as fluoride, chloride, or bromide, or mixtures thereof, and molecules of the following formulas

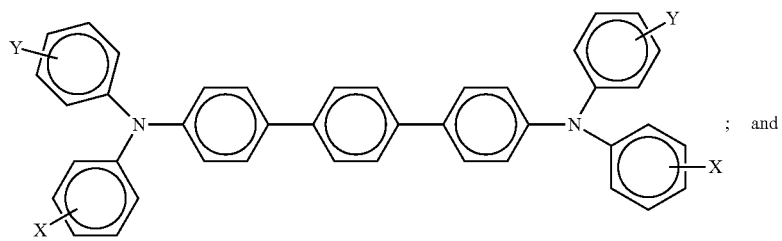

; and

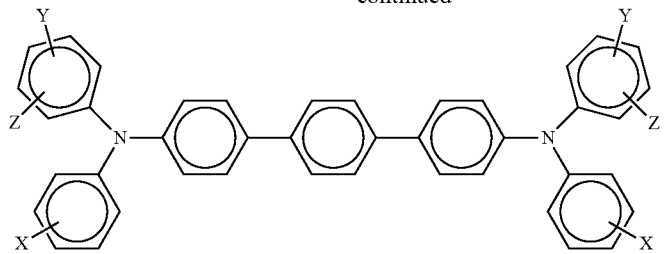

wherein X, Y and Z are independently alkyl, alkoxy, aryl, a halogen, or mixtures thereof.

The alkyl and alkoxy groups for the above charge transport compounds contain from 1 to about 25 carbon atoms, from 1 to about 12 carbon atoms, or from 1 to about 6 carbon atoms, such as methyl, ethyl, propyl, butyl, pentyl, and the corresponding alkoxides. Aryl can contain from about 6 to about 36 carbon atoms, from about 6 to about 24 carbon atoms, from about 6 to about 18 carbon atoms, or from about 6 to about 12 carbon atoms, such as phenyl, napthyl, and anthryl, and the like.

Examples of specific compounds that can be selected for the charge transport layer include N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein halo is a chloro substituent; bis(4-diethylamine-2-methylphenyl)phenylmethane; stylbene; hydrozone; enamine phenanthrene diamine; N,N'-bis-(3,4-dimethylphenyl)-4-biphenyl amine; N,N',bis-(4-methylphenyl)-N,N'-bis(4-ethylphenyl)-1,1'-3,3'-dimethylbiphenyl)-4,4'-diamine; 4-4'-bis(diethylamino)-2,2'-dimethyltriphenylmethane, N,N'-diphenyl-N,N'-bis(3-methylphenyl)-[1,1'-biphenyl]-4,4'-diamine, N,N'-diphenyl-N,N'-bis(alkylphenyl)-1,1'-biphenyl-4,4-diamine; N,N'-diphenyl-N,N'-bis(chlorophenyl)-1,1'-biphenyl-4,4'-diamine; N,N'-bis(4-butylphenyl)-N,N'-di-p-tolyl-[p-terphenyl]-4,4'-diamine; N,N'-bis(4-butylphenyl)-N,N'-di-m-tolyl-[p-terphenyl]-4,4'-diamine; N,N'-bis(4-butylphenyl)-N,N'-di-o-tolyl-[p-terphenyl]-4,4'-diamine; N,N'-bis(4-butylphenyl)-N,N'-bis-(4-isopropylphenyl)-[p-terphenyl]-4,4'-diamine; N,N'-bis(4-butylphenyl)-N,N'-bis-(2-ethyl-6-methylphenyl)-[p-terphenyl]-4,4'-diamine; N,N'-bis(4-butylphenyl)-N,N'-bis-(2,5-dimethylphenyl)-[p-terphenyl]-4,4'-diamine; N,N'-diphenyl-N,N'-bis(3-chlorophenyl)-[p-terphenyl]-4,4'-diamine; and the like, and mixtures thereof. Other known charge transport layer molecules that can be selected are described in U.S. Pat. Nos. 4,921,773 and 4,464,450, the disclosures of which are totally incorporated herein by reference.

Examples of small molecule charge transporting compounds that permit the injection of holes into the photogenerating layer with high efficiency, and transport the holes across the charge transport layer with short transit times include N,N'-diphenyl-N,N'-bis(3-methylphenyl)-(1,1'-biphenyl)-4,4'-diamine, N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, and N,N'-diphenyl-N,N'-bis(3-chlorophenyl)-[p-terphenyl]-4,4'-diamine, or mixtures thereof. When desired, the charge transport material in the charge transport layer may comprise a polymeric charge transport material, or a combination of a small molecule charge transport material and a polymeric charge transport material.

In embodiments, the charge transport compound can be represented by the following formulas/structures

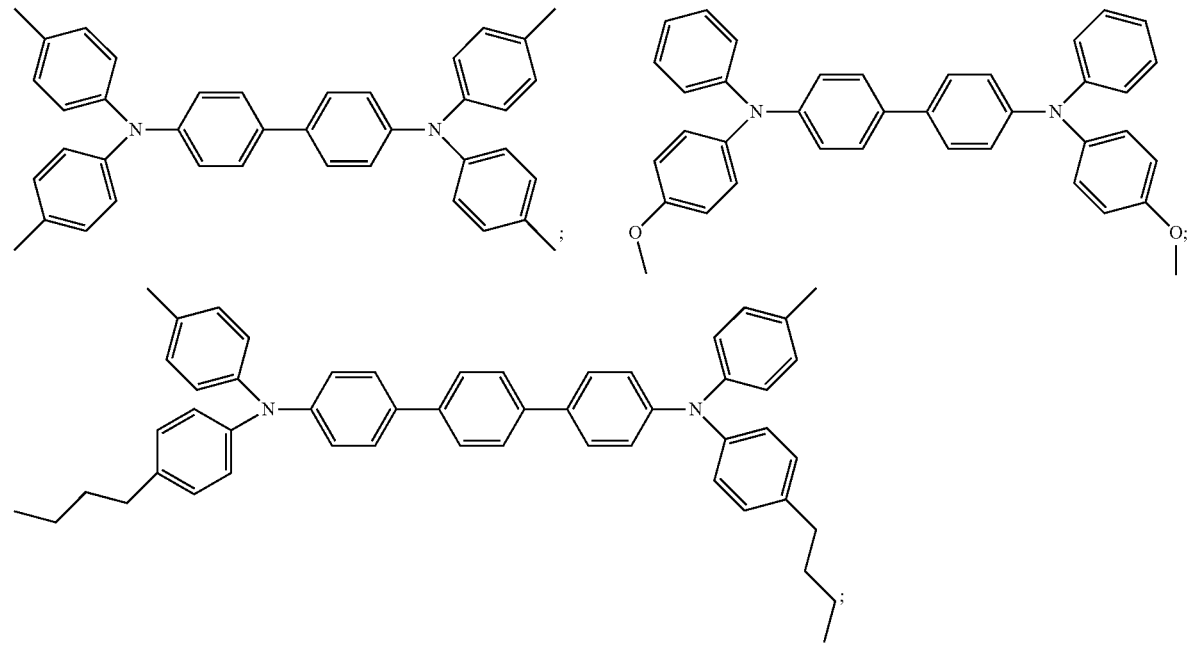

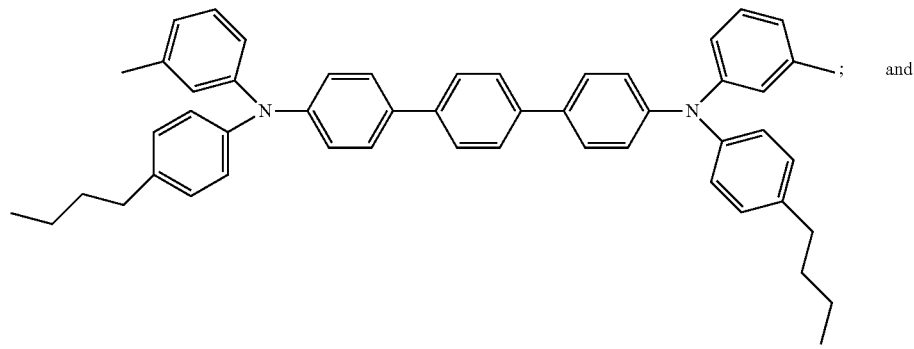

; and

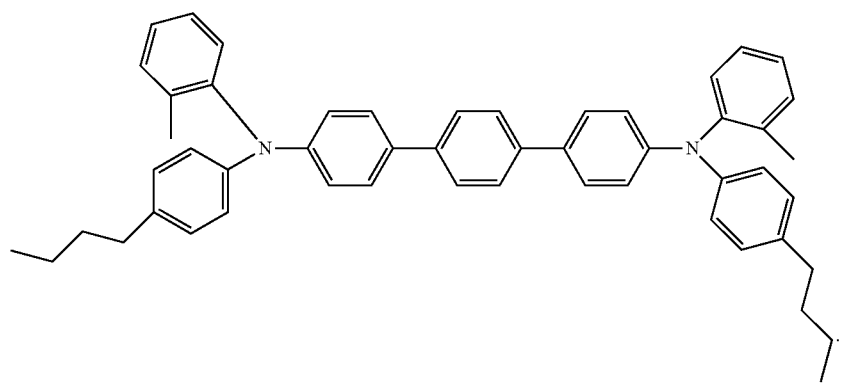

Generally, the charge transport layer contains from about 10 to about 75 percent by weight of the charge transport material, and more specifically, from about 35 percent to about 50 percent of this material based on the total solids.

Examples of first binder materials selected for the charge transport layers or charge transport layer include polycarbonates, polyarylates, acrylate polymers, vinyl polymers, cellulose polymers, polyesters, polysiloxanes, polyamides, polyurethanes, poly(cyclo olefins), epoxies, and random or alternating copolymers thereof; and more specifically, polycarbonates such as poly(4,4'-isopropylidene-diphenylene) carbonate (also referred to as bisphenol-A-polycarbonate), poly(4,4'-cyclohexylidine diphenylene) carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, electrically inactive binders are comprised of polycarbonate resins with a weight average molecular weight of from about 20,000 to about 100,000, or with a weight average molecular weight of from about 50,000 to about 100,000.

The disclosed photoconductor charge transport layer optional second binder in addition to the terpolymer may comprise a charge transporting polycarbonate selected from the group consisting of those of the following formulas/structures

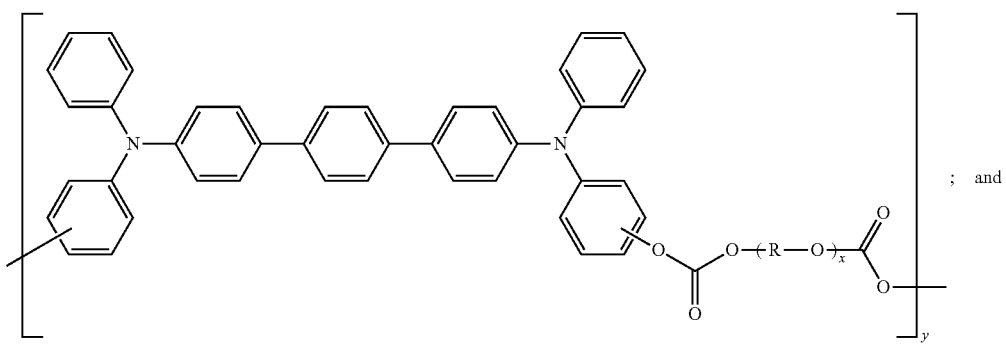

; and

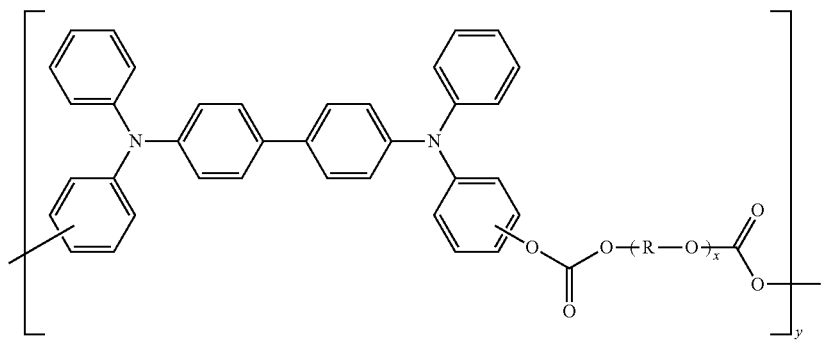

where R is a straight chain or branched alkylene with, for example, from 1 to about 18 carbon atoms, from 2 to about 15 carbon atoms, from 2 to about 10 carbon atoms, or from 2 to about 5 carbon atoms, like methylene, ethylene, propylene, butylene, pentylene, and the like; x represents the number of groups of from about 1 to about 20, from about 1 to about 15, from about 1 to about 10, from 1 to about 6, or from about 2 to about 7; and y represents the number of repeating segments in the charge transporting polycarbonate, and is a number of from about 10 to about 5,000, from about 50 to about 4,000, from about 100 to about 3,500, from about 200 to about 3,000, or from about 500 to about 2,000, and mixtures thereof.

Examples of specific charge transporting second binders that can be present in the charge transport layer or charge transport layers include those polymers represented by the following formulas/structures

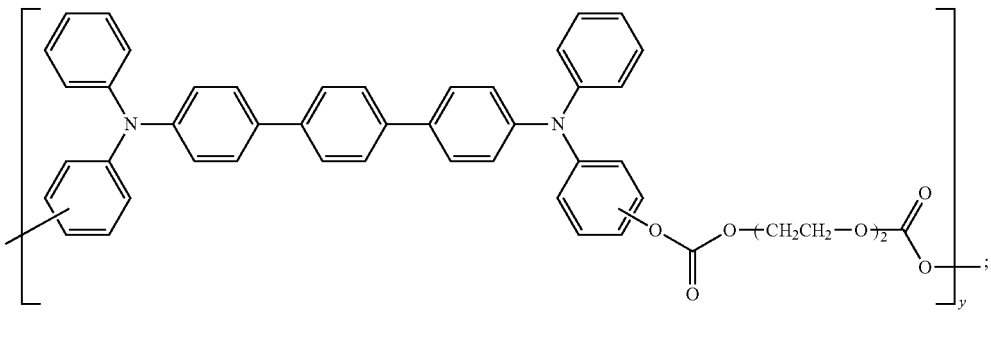

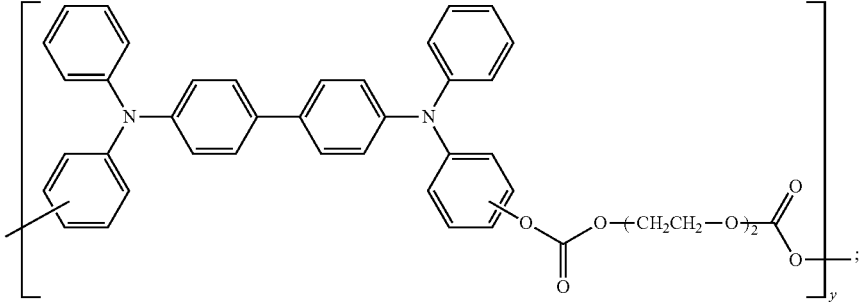

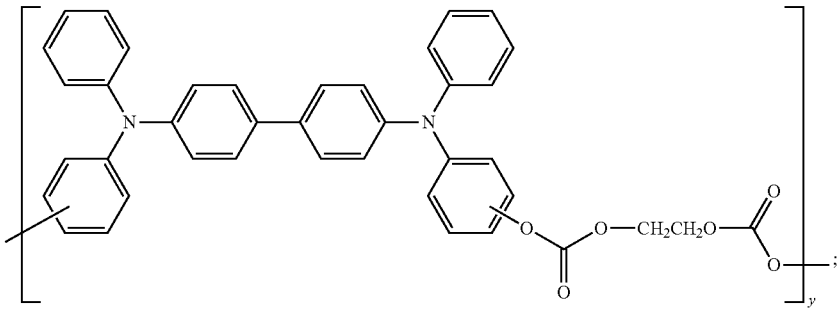

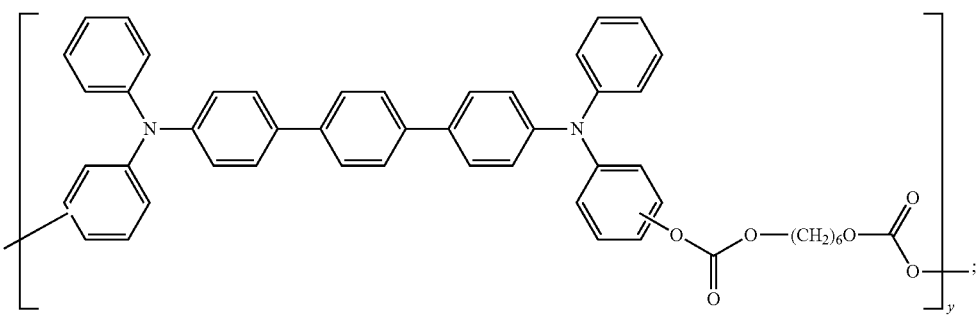
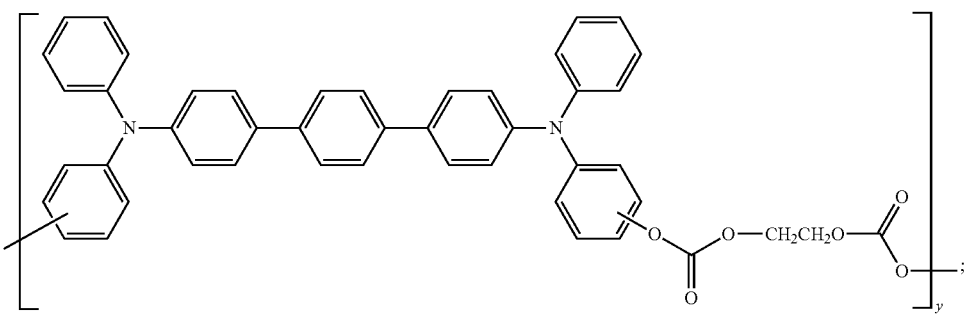
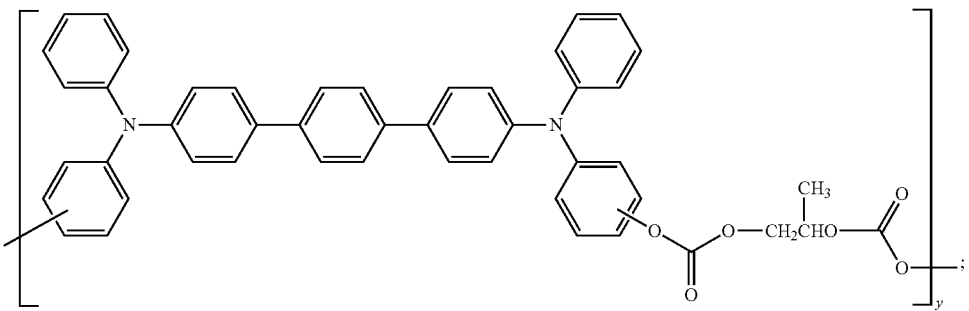
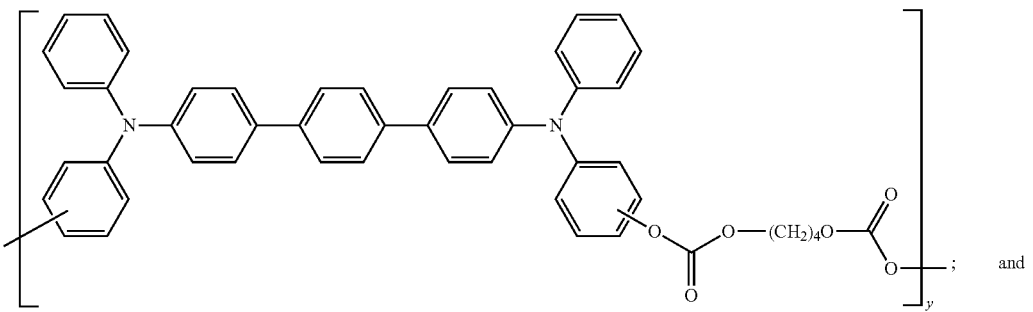
and
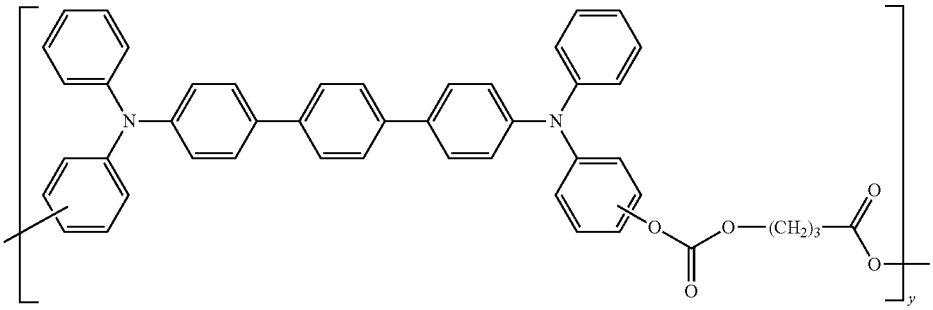

wherein y represents the number of repeating segments, and is, for example, a number of from about 10 to about 5,000, from about 50 to about 4,000, from about 100 to about 3,500, from about 200 to about 3,000, or from about 500 to about 2,000.

When present, the second binder can be present in the charge transport layer or layers in any suitable amount. For example, the second binder can be present in an amount of from about 40 to about 70 weight percent, or from about 30 to about 75 weight percent, based on a total solids content of the respective layer.

The charge transport layer or layers, and more specifically, a first charge transport in contact with the photogenerating layer, and thereover, a top or second charge transport overcoating layer, may comprise charge transporting small molecules dissolved or molecularly dispersed in a film forming electrically inert polymer such as a polycarbonate. In embodiments, "dissolved" refers, for example, to forming a solution in which the small molecule is dissolved in the polymer to form a homogeneous phase; and "molecularly dispersed" in embodiments refers, for example, to charge transporting molecules dispersed in the polymer, the small molecules being dispersed in the polymer on a molecular scale. Various charge transporting or electrically active small molecules may be selected for the charge transport layer or layers. In embodiments, charge transport refers, for example, to charge transporting molecules as a monomer that allows the free charge generated in the photogenerating layer to be transported across the transport layer.

A number of processes may be used to mix, and thereafter apply the charge transport layer or layers coating to the photogenerating layer. Typical application techniques include spraying, dip coating, roll coating, wire wound rod coating, and the like. Drying of the charge transport deposited coating may be effected by any suitable conventional technique such as oven drying, infrared radiation drying, air drying, and the like.

The charge transport layer can be from about 5 to about 75 microns, from about 40 to about 60 microns, or from about 10 to about 40 microns in thickness.

Examples of components or materials optionally incorporated into the charge transport layers, or at least one charge transport layer, to enable excellent lateral charge migration (LCM) resistance include hindered phenolic antioxidants, such as tetrakis methylene(3,5-di-tert-butyl-4-hydroxy hydrocinnamate)methane (IRGANOX™ 1010, available from Ciba Specialty Chemical), butylated hydroxytoluene (BHT), and other hindered phenolic antioxidants including SUMILIZER™ BHT-R, MDP-S, BBM-S, WX-R, NW, BP-76, BP-101, GA-80, GM and GS (available from Sumitomo Chemical Co., Ltd.), IRGANOX™ 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Co., Ltd.); hindered amine antioxidants such as SANOL™ LS-2626, LS-765, LS-770 and LS-744 (available from SNKYO CO., Ltd.), TINUVIN™ 144 and 622LD (available from Ciba Specialties Chemicals), MARK™ LA57, LA67, LA62, LA68 and LA63 (available from Asahi Denka Co., Ltd.), and SUMILIZER™ TPS (available from Sumitomo Chemical Co., Ltd.); thioether antioxidants such as SUMILIZER™ TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl)phenylmethane (BDETPM), bis-[2-methyl-4-(N-2-hydroxyethyl-N-ethyl-aminophenyl)]-phenylmethane (DHTPM), and the like. The weight percent of the antioxidant in at least one of the charge transport layers is from about 0 to about 20 weight percent, from about 1 to about 10 weight percent, or from about 3 to about 8 weight percent.

Photoconductors made according to the present disclosure provide benefits over conventional photoconductors in terms of at least improved ghosting characteristics and improved wear resistance. The photoconductors of the present disclosure also can avoid the need to apply, over the charge transport layer, an additional and commonly used outer protective or overcoating layer.

The ghosting characteristics of the photoconductors of the present disclosure in embodiments thereof, and as determined by grades as illustrated herein, are excellent of from about a −1 to about a −3.5, from about a −1 to about a −3, from about a −1 to about a −2.5, from about a −2 to about a −3.5, from about a −2 to about a −3, or from about a −2.5 to about a −3. The disclosed photoconductors also have an excellent wear rate of from about 15 nanometers per xerographic kilocycle to about 40 nanometers per xerographic kilocycle, from about 15 nanometers per xerographic kilocycle to about 28 nanometers per xerographic kilocycle, from about 15 to about 25 nanometers per xerographic kilocycle, from about 15 to about 18 nanometers per xerographic kilocycle, from about 10 to about 18 nanometers per xerographic kilocycle, or about 17 nanometers per xerographic kilocycle.

Also included within the scope of the present disclosure are methods of imaging and printing with the photoconductors illustrated herein. These methods generally involve the formation of an electrostatic latent image on the imaging member, followed by developing the image with a toner composition comprised, for example, of thermoplastic resin, colorant, such as pigment, charge additive, and surface additive, subsequently transferring the toner image to a suitable image receiving substrate, and permanently affixing the image thereto. In those environments wherein the photoconductor is to be used in a printing mode, the imaging method involves the same operation with the exception that exposure can be accomplished with a laser device or image bar. More specifically, the flexible photoconductors disclosed herein can be selected for the Xerox Corporation iGEN® machines that generate with some versions over 100 copies per minute. Processes of imaging, especially xerographic imaging and printing, including digital and/or color printing, are thus encompassed by the present disclosure. The imaging members are, in embodiments, sensitive in the wavelength region of, for example, from about 400 to about 900 nanometers, and in particular from about 650 to about 850 nanometers, thus diode lasers can be selected as the light source. Moreover, the imaging members of this disclosure are useful in color xerographic applications, particularly high-speed color copying and printing processes inclusive of digital xerographic processes.

The following Examples are being submitted to illustrate embodiments of the present disclosure. Products and structures were confirmed by NMR analysis.

Comparative Example 1

On a 30 millimeter thick aluminum drum substrate, an undercoat or hole blocking layer was prepared, and deposited thereon as follows.

Zirconium acetylacetonate tributoxide (35.5 parts), γ-aminopropyl triethoxysilane (4.8 parts), and poly(vinyl butyral) BM-S (2.5 parts) were dissolved in n-butanol (52.2 parts).

The resulting solution was then coated by a dip coater on the above aluminum drum substrate, and the coating solution layer was preheated at 59° C. for 13 minutes, humidified at 58° C. (dew point=54° C.) for 17 minutes, and dried at 135° C. for 8 minutes. The thickness of the resulting undercoat layer was approximately 1.3 microns.

A photogenerating layer, 0.2 micron in thickness, comprising chlorogallium phthalocyanine (Type C) was deposited on the above undercoat layer. The photogenerating layer coating dispersion was prepared as follows:

2.7 Grams of chlorogallium phthalocyanine (ClGaPc) Type C pigment were mixed with 2.3 grams of the polymeric binder (a carboxyl-modified vinyl copolymer, VMCH, available from Dow Chemical Company), 15 grams of n-butyl acetate, and 30 grams of xylene. The resulting mixture was mixed in an Attritor mill with about 200 grams of 1 millimeter Hi-Bea borosilicate glass beads for about 3 hours. The dispersion mixture obtained was then filtered through a 20 micron Nylon cloth filter, and the solids content of the dispersion was diluted to about 6 weight percent.

Subsequently, a 29 micron charge transport layer was coated on top of the above photogenerating layer from a solution prepared by dissolving N,N'-diphenyl-N,N-bis(3-methylphenyl)-1,1'-biphenyl-4,4'-diamine (4 grams), and a film forming polymer binder PCZ-400 [poly(4,4'-dihydroxy-diphenyl-1-1-cyclohexane, $M_w$=40,000)], available from Mitsubishi Gas Chemical Company, Ltd., (6 grams) in a solvent mixture of 21 grams of tetrahydrofuran (THF), and 9 grams of toluene (70/30), followed by drying in an oven at about 120° C. for about 40 minutes. The resulting charge transport layer PCZ-400/diamine ratio was 60/40.

Example I

A photoconductor was prepared by substantially repeating the process of Comparative Example 1 except that a 29 micron thick charge transport layer was coated on top of the photogenerating layer from a solution prepared from N,N'-diphenyl-N,N-bis(3-methylphenyl)-1,1'-biphenyl-4,4'-diamine (4 grams), PCZ-400 [poly(4,4'-dihydroxy-diphenyl-1-1-cyclohexane, $M_w$=40,000)], available from Mitsubishi Gas Chemical Company, Ltd. (5.9 grams), and the acrylonitrile-butadiene-styrene terpolymer, BLENDEX® 200, as obtained from Chemtura Corporation (0.1 gram). and that contains 25 weight percent of acrylonitrile, 20 weight percent of butadiene, and 55 weight percent of styrene. The ratio of PCZ-400/diamine/BLENDEX® 200 was 59/40/1.

Example II

A photoconductor is prepared by substantially repeating the process of Example I except that the BLENDEX® 200 is replaced with the terpolymers of BLENDEX® 131, 336, 338, 360, 415, 598, or 703. The ratios of PCZ400/diamine/BLENDEX® 131, 336, 338, 360, 415, 598, or 703 are 59.5/40/0.5.

Electrical Property Testing

The above prepared photoconductors of Comparative Example 1 and Example I were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic curves (PIDCs) from which the photosensitivity and surface potentials at various exposure intensities were measured. Additional electrical characteristics were obtained by a series of charge-erase cycles with incrementing surface potential to generate several voltages versus charge density curves. The scanner was equipped with a scorotron set to a constant voltage charging at various surface potentials. The above photoconductors were tested at surface potentials of 700 volts with the exposure light intensity incrementally increased by means of regulating a series of neutral density filters, and the exposure light source was a 780 nanometer light emitting diode. The xerographic simulation was completed in an environmentally controlled light tight chamber at ambient conditions (40 percent relative humidity and 22° C.).

Similar PIDCs were obtained for the above two photoconductors of Comparative Example 1 and Example I. Therefore, the incorporation of the above terpolymer into the charge transport layer did not adversely affect the electrical properties of the photoconductor.

Wear Testing

Wear tests of the photoconductors of Comparative Example 1 and Example I were performed using a wear test fixture (biased charging roll, BCR charging, and peak to peak voltage of 1.45 kilovolts). The total thickness of each photoconductor was measured by a Permascope before each wear test was initiated. Then the photoconductors were separately placed into the wear fixture for 50 kilocycles. The total photoconductor thickness was measured again with the Permascope, and the difference in thickness was used to calculate the wear rate (nanometers/kilocycle) of the photoconductors. The smaller the wear rate value, the more wear resistant was the photoconductor.

TABLE 1

| PHOTOCONDUCTORS | WEAR RATE (NM/KCYCLE) |
|---|---|
| Comparative Example 1 | 27.8 |
| Example I | 17.4 |

The 17.4 nanometers/kilocycle wear rate for the Example I photoconductor versus the 27.8 nanometers/kilocycle wear rate for the Comparative Example 1 photoconductor effectively extends the life of the Example 1 photoconductor by about 60 percent.

Long term testing, up to about 500,000 xerographic cycles in the Xerox Corporation WorkCentre™ Pro C3545, illustrated that the cyclic stability of the Example I photoconductor charge transport layer in both A zone and J zone (85° F. and 80 percent humidity for A zone, 70° F. and 10 percent humidity for J zone) were excellent and comparable to the Comparative Example 1 A zone and J zone charge transport layer photoconductor.

Ghosting Measurements

Ghosting refers, for example, to when a photoconductor is selectively exposed to positive charges in a number of xerographic print engines, and where some of the positive charges enter the photoconductor and manifest themselves as a latent image in the subsequent printing cycles. This print defect can cause a change in the lightness of the half tones, and is commonly referred to as a "ghost" that is generated in the previous printing cycle. An example of a source of the positive charges is the stream of positive ions emitted from the transfer corotron. Because the paper sheets are situated between the transfer corotron and the photoconductor, the photoconductor is shielded from the positive ions from the paper sheets. In the areas between the paper sheets, the photoconductor is fully exposed, thus in this paper free zone the positive charges may enter the photoconductor. As a result, these charges cause a print defect or ghost in a half tone print if one switches to a larger paper format that covers the previous paper print free zone.

Generally, the xerographic prints for determining ghosting characteristics includes an X symbol or letter on a half toned image. When X is invisible, the ghost level is assigned Grade 0; when X is barely visible, the ghost level is assigned Grade 1; Grade 2 to Grade 5 refers to the level of visibility of the X with Grade 5 meaning a dark and visible X. Ghosting levels were visually measured against an empirical scale, the smaller the ghosting grade (absolute value), the better the print quality.

The photoconductors of Comparative Example 1 and the Example I were evaluated in accordance with the above processes for their A zone and J zone ghosting performances. More specifically, the Comparative Example 1 and the Example I photoconductors were acclimated at room temperature for 24 hours before the testing in A zone (85° F. and 80 percent humidity) and in J zone (70° F. and 10 percent humidity) for ghosting. Xerographic print testing was accomplished in the Xerox Corporation WorkCentre™ Pro C3545 using 500 print counts.

The negative ghosting grade number, of –2.5 in A zone, and –2 in J zone for Example I, translates into improved and excellent ghosting characteristics as compared to Comparative Example 1. The ghosting results are summarized in Table 2.

TABLE 2

| EXAMPLE | A ZONE GHOSTING T = 500 prints | J ZONE GHOSTING T = 500 prints |
|---|---|---|
| Comparative Example 1 | Grade –3 | Grade –2 |
| Example I | Grade –2.5 | Grade –2 |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A photoconductor consisting of a supporting substrate, a single charge transport layer that includes a charge transport component, an optional polycarbonate resin binder and an acrylonitrile-butadiene-styrene polymer wherein said acrylonitrile-butadiene-styrene polymer consists of said acrylonitrile present in an amount of from about 15 to about 35 weight percent, said butadiene present in an amount of from about 5 to about 30 weight percent, and said styrene present in an amount of from about 40 to about 60 weight percent based on a total of about 100 percent and wherein said acrylonitrile-butadiene-styrene polymer is present in said charge transport layer in an amount of from about 0.5 to about 10 weight percent based on the charge transport layer solids and wherein said charge transport component is represented by the following formulas/structures

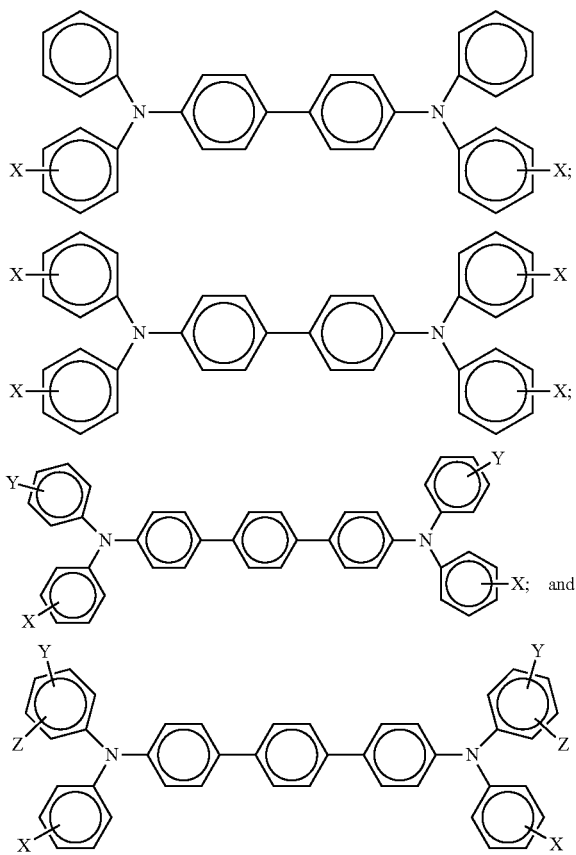

wherein X, Y, and Z are independently selected from the group consisting of alkyl, alkoxy, aryl, halogen, and mixtures thereof and a photogenerating layer in contact with said charge transport layer.

2. A photoconductor in accordance with claim 1 wherein said charge transport component is selected from the group consisting of those represented by the following formulas/structures

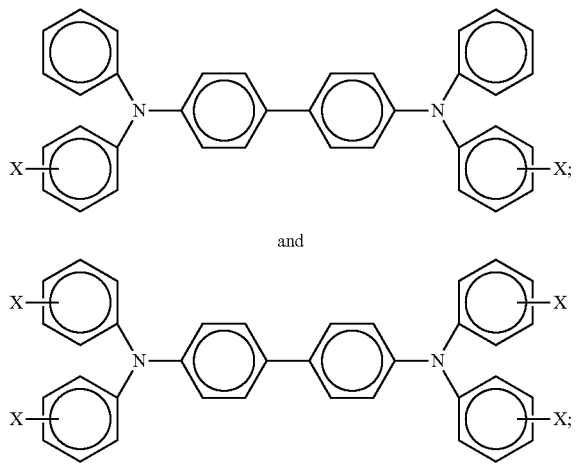

wherein X is selected from the group consisting of alkyl, halogen, and mixtures thereof.

3. A photoconductor in accordance with claim 1 wherein said charge transport component is selected from the group consisting of those represented by the following formulas/structures

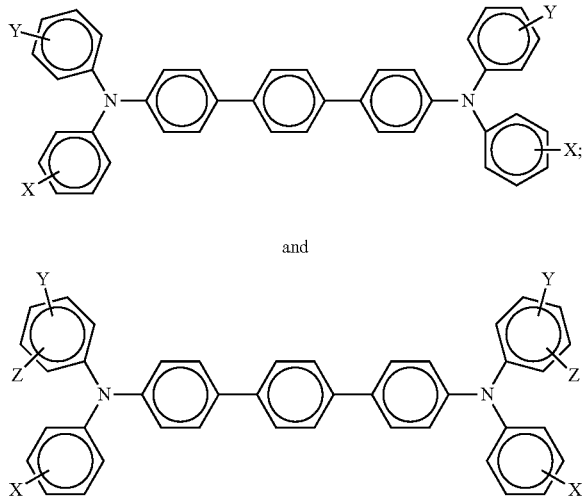

and wherein X, Y, and Z are independently selected from the group consisting of alkyl, alkoxy, halogen, and mixtures thereof.

4. A photoconductor in accordance with claim 1 wherein said acrylonitrile is present in an amount of from about 20 to about 30 weight percent, said butadiene is present in an amount of from about 10 to about 25 weight percent, and said styrene is present in an amount of from about 45 to about 55 weight percent based on a total of about 100 percent.

5. A photoconductor in accordance with claim 1 wherein said acrylonitrile is present in an amount of from about 22 to about 28 weight percent, said butadiene is present in an amount of from about 12 to about 22 weight percent, and said styrene is present in an amount of from about 47 to about 53 weight percent based on a total of about 100 percent.

6. A photoconductor in accordance with claim 1 wherein said acrylonitrile-butadiene-styrene polymer has a weight average molecular weight of from about 25,000 to about 400,000, and a number average molecular weight of from about 20,000 to about 200,000.

7. A photoconductor in accordance with claim 1 wherein said acrylonitrile-butadiene-styrene polymer is present in said charge transport layer in an amount of from about 0.1 to about 10 weight percent based on the charge transport layer solids.

8. A photoconductor in accordance with claim 1 wherein said acrylonitrile-butadiene-styrene polymer is present in said charge transport layer in an amount of from about 0.5 to about 3 weight percent, and wherein said polycarbonate resin binder is present in an amount of from about 40 to about 70 weight percent based on the charge transport layer solids.

9. A photoconductor in accordance with claim 1 wherein said photoconductor exhibits a wear rate of from about 10 to about 18 nanometers per xerographic kilocycle.

10. A photoconductor in accordance with claim 1 wherein said polycarbonate resin binder is present and is selected from the group consisting of poly(4,4'-dihydroxy-diphenyl-1-1-cyclohexane)carbonate, poly(4,4'-isopropytidene-diphenylene)carbonate, poly(4,4'-cyclohexylidine diphenylene) carbonate, and poly(4,4'-isopropylidene-3,3'-dimethyl-diphenyl)carbonate, and wherein said polycarbonate is present in an amount of from about 30 to about 75 weight percent based on the charge transport layer solids.

11. A photoconductor in accordance with claim 1 wherein said charge transport component is selected from the group consisting of N,N'-bis(methylphenyl)-1,1-biphenyl-4,4'-diamine, tetra-p-tolyl-biphenyl-4,4'-diamine, N,N'-diphenyl-N,N'-bis(4-methoxyphenyl)-1,1-biphenyl-4,4'-diamine, N,N'-bis(4-butylphenyl)-N,N'-di-p-tolyl-[p-terphenyl]-4,4'-diamine, N,N'-bis(4-butylphenyl)-N,N'-di-m-tolyl-[p-terphenyl]-4,4'-diamine, N,N'-bis(4-butylphenyl)-N,N'-di-o-tolyl-[p-terphenyl]-4,4'-diamine, N,N'-bis(4-butylphenyl)-N,N'-bis-(4-isopropylphenyl)-[p-terphenyl]-4,4'-diamine, N,N'-bis(4-butylphenyl)-N,N'-bis-(2-ethyl-6-methylphenyl)-[p-terphenyl]-4,4'-diamine, N,N'-bis(4-butylphenyl)-N,N'-bis-(2,5-dimethylphenyl)-[p-terphenyl]-4,4'-diamine, 4-4'-bis(diethylamino)-2,2'-dimethyltriphenylmethane; N,N'-diphenyl-N,N'-bis(4-methylphenyl)-1,1'-biphenyl-4,4'diamine, N,N'-diphenyl-N,N'-bis(alkylphenyl)-1,1'-biphenyl-4,4-diamine, N,N'-diphenyl-N,N'-bis(chlorophenyl)-1,1'-biphenyl-4,4'-diamine, and N,N'-diphenyl-N,N'-bis(3-chlorophenyl)-[p-terphenyl]-4,4'-diamine.

12. A photoconductor in accordance with claim 1 wherein said photogenerating layer includes a photogenerating pigment selected from the group consisting of a titanyl phthalocyanine, a hydroxygallium phthalocyanine, a halogallium phthalocyanine, and mixtures thereof.

13. A photoconductor consisting of a supporting substrate, a photogenerating layer, and a single charge transport layer that consists of a mixture of a charge transport compound, a polycarbonate, and an acrylonitrile-butadiene-styrene terpolymer layer wherein said acrylonitrile is present in an amount of from about 15 to about 35 weight percent, said butadiene is present in an amount of from about 5 to about 30 weight percent, and said styrene is present in an amount of from about 40 to about 60 weight percent based on a total of about 100 percent and wherein said acrylonitrile-butadiene-styrene polymer is present in said charge transport layer in an amount of from about 0.5 to about 10 weight percent based on the charge transport layer solids and wherein said charge transport compound is represented by the following formulas/structures

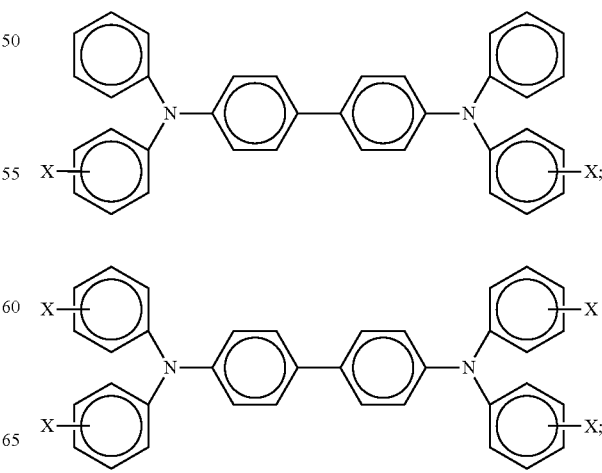

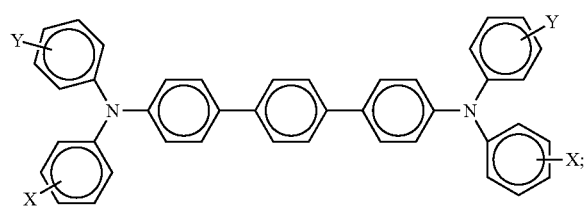

and

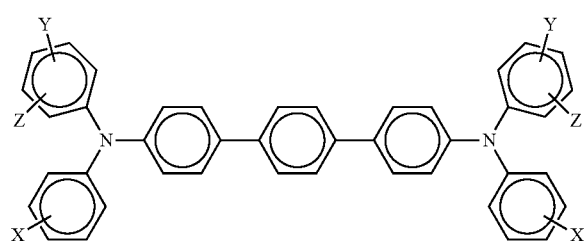

wherein X, Y, and Z are independently selected from the group consisting of alkyl, alkoxy, aryl, halogen, and mixtures thereof.

14. A photoconductor in accordance with claim 13 wherein said butadiene is 1,3-butadiene.

15. A photoconductor in accordance with claim 13 wherein said acrylonitrile is present in an amount of from about 20 to about 30 weight percent, said butadiene is present in an amount of from about 10 to about 25 weight percent, and said styrene is present in an amount of from about 45 to about 55 weight percent based on a total of about 100 percent.

16. A photoconductor in accordance with claim 13 wherein said polycarbonate is selected from the group consisting of poly(4,4'-dihydroxy-diphenyl-1-cyclohexane)carbonate, poly(4,4'-isopropylidene-diphenylene)carbonate, poly(4,4'-cyclohexylidine diphenylene)carbonate, and poly(4,4'-isopropylidene-3,3'-dimethyl-diphenyl)carbonate, and wherein said polycarbonate is present in an amount of from about 30 to about 75 weight percent based on the charge transport layer solids.

17. A wear resistant photoconductor consisting of a supporting substrate layer, an anticurl layer, a hole blocking layer, an optional ground strip segment, an adhesive layer, a photogenerating layer, and a single charge transport layer containing a mixture of a charge transport compound and an acrylonitrile-butadiene-styrene polymer wherein said acrylonitrile is present in an amount of from about 20 to about 30 weight percent, said butadiene is present in an amount of from about 10 to about 25 weight percent, and said styrene is present in an amount of from about 45 to about 55 weight percent based on a total of about 100 percent and wherein said acrylonitrile-butadiene-styrene polymer is present in said charge transport layer in an amount of from about 0.5 to about 10 weight percent based on the charge transport layer solids, wherein said charge transport layer compound is selected from the group consisting of those represented by the following formulas/structures

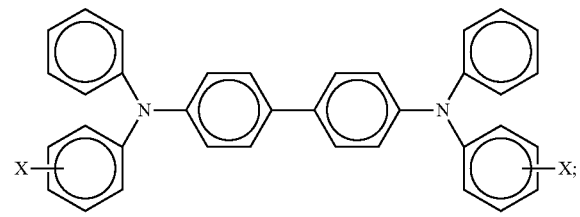

and

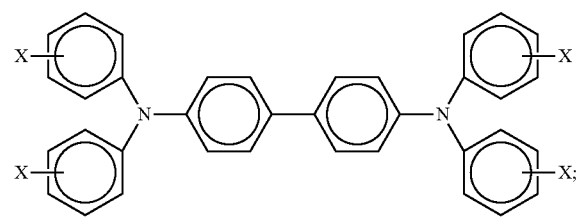

wherein X is selected from the group consisting of alkyl, alkoxy, aryl, halogen, and mixtures thereof and where the photoconductor wear rate is from about 15 to about 25 nanometers per kilocycle.

18. A photoconductor consisting in sequence of a supporting substrate, a photogenerating layer, and a single charge transport layer consisting of a charge transport component and an acrylonitrile-butadiene-styrene polymer, wherein said acrylonitrile-butadiene-styrene polymer consists of said acrylonitrile present in an amount of from about 15 to about 35 weight percent, said butadiene present in an amount of from about 5 to about 30 weight percent, and said styrene present in an amount of from about 40 to about 60 weight percent based on a total of about 100 percent and wherein said acrylonitrile-butadiene-styrene polymer is present in said charge transport layer in an amount of from about 0.5 to about 10 weight percent based on the charge transport layer solids and wherein said charge transport layer component is selected from the group consisting of those represented by the following formulas/structures

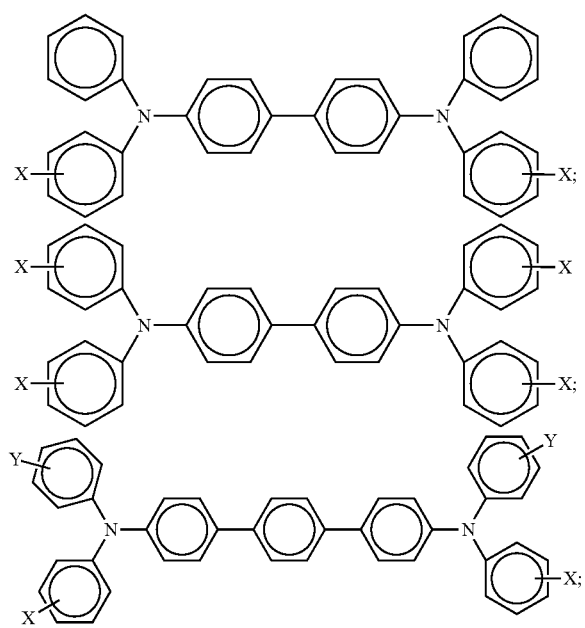

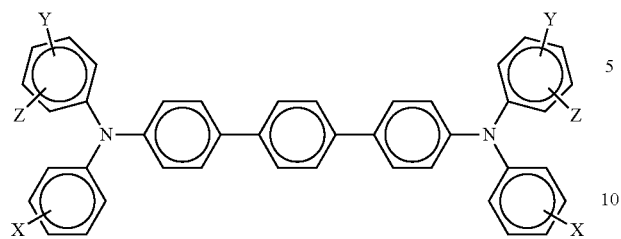
wherein X, Y, and Z are independently selected from the group consisting of alkyl, alkoxy, aryl, halogen, and mixtures thereof, where the photoconductor wear rate is from about 15 to about 25 nanometers per kilocycle.
* * * * *